(12) United States Patent
Byun et al.

(10) Patent No.: US 11,624,857 B2
(45) Date of Patent: Apr. 11, 2023

(54) ANTI-REFLECTIVE FILM, POLARIZING PLATE, AND DISPLAY APPARATUS

(71) Applicant: LG CHEM, LTD., Seoul (KR)

(72) Inventors: Jinseok Byun, Daejeon (KR); Jeongkyu Lee, Daejeon (KR); Jin Yeung Lee, Daejeon (KR); Kwangseok Seo, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 387 days.

(21) Appl. No.: 16/649,904

(22) PCT Filed: Jun. 19, 2019

(86) PCT No.: PCT/KR2019/007398
§ 371 (c)(1),
(2) Date: Mar. 23, 2020

(87) PCT Pub. No.: WO2020/004860
PCT Pub. Date: Jan. 2, 2020

(65) Prior Publication Data
US 2020/0309996 A1 Oct. 1, 2020

(30) Foreign Application Priority Data
Jun. 26, 2018 (KR) .................. 10-2018-0073599

(51) Int. Cl.
| | | |
|---|---|---|
| *G02B 1/111* | (2015.01) | |
| *G02B 1/14* | (2015.01) | |
| *C08J 7/04* | (2020.01) | |
| *C08J 5/18* | (2006.01) | |
| *C08K 7/26* | (2006.01) | |
| *C08L 33/08* | (2006.01) | |

(52) U.S. Cl.
CPC .............. *G02B 1/111* (2013.01); *C08J 5/18* (2013.01); *C08J 7/0427* (2020.01); *C08K 7/26* (2013.01); *C08L 33/08* (2013.01); *G02B 1/14* (2015.01); *C08J 2333/08* (2013.01); *C08J 2433/08* (2013.01); *C08K 2201/014* (2013.01)

(58) Field of Classification Search
CPC .. G02B 1/111; G02B 1/14; G02B 1/12; G02B 5/305; C08J 7/046; C08J 5/18; C08J 7/042; C08J 2367/02; C08J 2367/03; C08J 2435/02; C08J 2475/06; C08J 2483/04; C08F 283/006; C08G 18/673; C08G 18/7621; C08G 77/045; C08K 7/22; C08K 3/36; C08K 7/26; C08K 2201/011; C08L 25/14; C08L 51/08; C09D 133/08; B82Y 30/00
See application file for complete search history.

(56) References Cited

U.S. PATENT DOCUMENTS

| | | | |
|---|---|---|---|
| 9,250,371 B2 * | 2/2016 | Won .................. | G02B 5/3016 |
| 2008/0088925 A1 | 4/2008 | Yoneyama et al. | |
| 2011/0317263 A1 | 12/2011 | Yoneyama et al. | |
| 2013/0143028 A1 | 6/2013 | Asahi et al. | |
| 2016/0062012 A1 * | 3/2016 | Shin .................. | G02B 5/3033 428/1.31 |
| 2016/0077239 A1 * | 3/2016 | Asahi ................ | G02B 1/118 359/601 |
| 2016/0304722 A1 | 10/2016 | Kobori | |
| 2017/0131439 A1 | 5/2017 | Kobori et al. | |
| 2018/0106929 A1 | 4/2018 | Song et al. | |
| 2018/0217297 A1 * | 8/2018 | Kim .................. | C08J 7/044 |
| 2018/0231687 A1 | 8/2018 | Byun et al. | |
| 2018/0305472 A1 | 10/2018 | Kobori et al. | |
| 2019/0004214 A1 * | 1/2019 | Kim .................. | C09D 5/006 |
| 2019/0025467 A1 | 1/2019 | Byun et al. | |
| 2019/0137658 A1 | 5/2019 | Song et al. | |
| 2019/0137659 A1 | 5/2019 | Song et al. | |
| 2020/0241173 A1 * | 7/2020 | Byun ................. | B32B 7/02 |
| 2020/0348450 A1 * | 11/2020 | Byun ................. | C08L 25/14 |
| 2021/0206935 A1 * | 7/2021 | Byun ................. | C08J 5/18 |
| 2021/0223438 A1 * | 7/2021 | Baek ................. | C09D 1/00 |
| 2021/0309863 A1 * | 10/2021 | Byun ................. | C09D 7/67 |

FOREIGN PATENT DOCUMENTS

| | | | | |
|---|---|---|---|---|
| CN | 101160261 A | 4/2008 | | |
| CN | 108027452 A | 5/2018 | | |
| EP | 3163336 A | 5/2017 | | |
| JP | 2005-274696 A | 10/2005 | | |
| JP | 2007241661 A * | 9/2007 | ......... | G06F 3/1208 |
| JP | 2008-107792 A | 5/2008 | | |
| JP | 2009-035594 A | 2/2009 | | |
| JP | 2009-067828 A | 4/2009 | | |
| JP | 2009-086360 A | 4/2009 | | |
| JP | 2010-085894 A | 4/2010 | | |

(Continued)

OTHER PUBLICATIONS

Extended European Search Report dated Jan. 28, 2021, of the corresponding European Patent Application No. 19826403.8, 7 page.

(Continued)

*Primary Examiner* — Tamra L. Dicus

(74) *Attorney, Agent, or Firm* — Rothwell, Figg, Ernst & Manbeck, P.C.

(57) ABSTRACT

Provided are an anti-reflective film including a low-refractive layer having mechanical properties such as high abrasion resistance and scratch resistance, etc., and excellent optical properties, and a hard coating layer, a polarizing plate including the same, and a display device including the same.

12 Claims, No Drawings

(56) References Cited

FOREIGN PATENT DOCUMENTS

| | | | |
|---|---|---|---|
| JP | 2011-248036 A | | 12/2011 |
| JP | 2015-108733 A | | 6/2015 |
| JP | 2016-155992 A | | 9/2016 |
| JP | 2017-049313 A | | 3/2017 |
| JP | 2017-082199 A | | 5/2017 |
| KR | 10-2006-0031941 A | | 4/2006 |
| KR | 10-2008-0004469 A | | 1/2008 |
| KR | 20100121281 A | * | 11/2010 |
| KR | 10-2014-0006922 A | | 1/2014 |
| KR | 10-2015-0038319 A | | 4/2015 |
| KR | 10-2017-0106920 A | | 9/2017 |
| KR | 10-2019-0090296 A | | 8/2019 |
| WO | 2006-016542 A1 | | 2/2006 |
| WO | 2014-022368 A2 | | 2/2014 |
| WO | 2016-084729 A1 | | 6/2016 |
| WO | 2017-155338 A1 | | 9/2017 |

OTHER PUBLICATIONS

International Search Report and Written Opinion issued for International Application No. PCT/KR2019/007398 dated Oct. 2, 2019. 11 pages.

* cited by examiner

ANTI-REFLECTIVE FILM, POLARIZING PLATE, AND DISPLAY APPARATUS

CROSS-REFERENCE TO RELATED APPLICATION(S)

The present application is a 35 U.S.C. 371 National Phase Entry Application from PCT/KR2019/007398, filed on Jun. 19, 2019, designating the United States and which is based on, and claims priority from, Korean Patent Application No. 10-2018-0073599, filed on Jun. 26, 2018, the disclosure of which are hereby incorporated by reference herein in their entirety.

The present invention relates to an anti-reflective film, a polarizing plate, and a display device.

BACKGROUND OF THE INVENTION

In general, an anti-reflective film is mounted on a flat-panel display device such as a PDP, LCD, etc., in order to minimize reflection of incident light from the outside. As a method of minimizing reflection of light, there are a method of dispersing fillers such as inorganic fine particles in a resin and coating the resin on a substrate film to impart unevenness (anti-glare: AG coating), a method of forming a plurality of layers having different refractive indices on a substrate film to use light interference (anti-reflection: AR coating), a combination of these methods, etc.

Among them, in the case of the AG coating, an absolute amount of reflected light is equivalent to that in a general hard coating method, but it is possible to obtain a low-reflection effect by decreasing an amount of light entering the eyes using light scattering through unevenness. However, in the AG coating, sharpness of a screen is deteriorated due to surface unevenness, and thus many studies have recently been conducted on the AR coating method.

As a film using the AR coating method, a film having a multilayer structure in which a hard coating layer (a high-refractive index layer), a low-reflective coating layer, and the like are laminated on a substrate film has been commercialized. However, the film using the existing AR coating method has a disadvantage in that visibility is lowered due to an increase of reflectance at a portion that is damaged or deformed due to external rubbing or friction. Accordingly, many studies have been conducted to obtain an anti-reflective film of which reflectance is not increased even if part of the surface is damaged or deformed due to external influences.

BRIEF SUMMARY OF THE INVENTION

The present invention provides an anti-reflective film effectively inhibiting an increase of reflectance at a portion that is damaged or deformed due to external rubbing or friction, while having mechanical properties such as high abrasion resistance and scratch resistance, etc., and excellent optical properties.

Further, the present invention provides a polarizing plate including the anti-reflective film.

In addition, the present invention provides a display device including the anti-reflective film and providing high sharpness of a screen.

The present disclosure provides an anti-reflective film including: a hard coating layer; and a low-refractive layer including an organic polymer resin and two or more kinds of hollow inorganic particles having different particle sizes which are dispersed in the organic polymer resin, wherein the two or more kinds of hollow inorganic particles having different particle sizes include one kind of hollow inorganic particles having a particle size of 35 nm to 61 nm and one kind of hollow inorganic particles having a particle size of 64 nm to 100 nm, and the anti-reflective film exhibits one or more peaks at a scattering vector ($q_{max}$) of 0.128 $nm^{-1}$ to 0.209 $nm^{-1}$ in a graph showing a log value of a scattering intensity to a scattering vector defined in small-angle X-ray scattering.

Further, the present disclosure provides a polarizing plate including the anti-reflective film.

In addition, the present disclosure provides a display device including the anti-reflective film.

DETAILED DESCRIPTION OF THE INVENTION

Hereinafter, an anti-reflective film according to specific embodiments of the present invention and a display device including the same will be described in more detail.

In the present disclosure, a low-refractive layer refers to a layer having a low refractive index, for example, a refractive index of about 1.2 to about 1.6 at a wavelength of 550 nm.

Further, a hollow inorganic particle refers to a particle having a shape in which an empty space is present on the surface and/or inside of an inorganic particle.

In addition, (meth)acrylate is used as a concept including both acrylate and methacrylate.

A (co)polymer is used as a concept including both a co-polymer and a homo-polymer.

A fluorine-containing compound refers to a compound including at least one fluorine element therein.

A photopolymerizable compound collectively refers to a polymer compound polymerized by light irradiation, for example, visible light or UV light irradiation.

A peak means a point at which a y value exhibits a maximum value (or extreme value), when an x value is changed and the y value corresponding thereto is recorded with regard to particular measured quantities x and y. In this regard, the maximum value means the greatest value in the periphery, and the extreme value means the value at which the instantaneous rate of change is 0.

According to one embodiment of the present invention, an anti-reflective film is provided, including: a hard coating layer; and a low-refractive layer including an organic polymer resin and two or more kinds of hollow inorganic particles having different particle sizes which are dispersed in the organic polymer resin, wherein the two or more kinds of hollow inorganic particles having different particle sizes include one kind of hollow inorganic particles having a particle size of 35 nm to 61 nm and one kind of hollow inorganic particles having a particle size of 64 nm to 100 nm, and the anti-reflective film exhibits one or more peaks at a scattering vector ($q_{max}$) of 0.128 $nm^{-1}$ to 0.209 $nm^{-1}$ in a graph showing a log value of scattering intensity to a scattering vector defined in small-angle X-ray scattering.

The present inventors studied anti-reflective films, and found that an anti-reflective film fulfilling the requirements of including the low-refractive layer including two or more kinds of hollow inorganic particles having different particle sizes and exhibiting one or more peaks at the scattering vector ($q_{max}$) of 0.128 $nm^{-1}$ to 0.209 $nm^{-1}$ in a graph showing the log value of the scattering intensity to a scattering vector defined in small-angle X-ray scattering, may effectively inhibit an increase of reflectance at a portion that is damaged or deformed due to external rubbing or friction, while having mechanical properties such as high abrasion resistance and scratch resistance, etc., and excellent optical properties. Accordingly, when the anti-reflective film is used in a display device, it is possible to remarkably improve a glare phenomenon caused by incident light from the outside of the device without deteriorating quality of an image, and to effectively protect the surface of the device from external impact, stimulation, etc.

Specifically, whether or not the anti-reflective film may exhibit one or more peaks of the log value of scattering intensity at the scattering vector ($q_{max}$) of 0.128 nm$^{-1}$ to 0.209 nm$^{-1}$, in the graph showing the log value of scattering intensity to the scattering vector defined in small-angle X-ray scattering, may be related to the internal structure of the anti-reflective film, for example, the average distance between the two or more kinds of hollow inorganic particles having different particle sizes which are included in the low-refractive layer of the anti-reflective film.

The anti-reflective film fulfilling the requirement of exhibiting one or more peaks at the scattering vector ($q_{max}$) of 0.128 nm$^{-1}$ to 0.209 nm$^{-1}$, in the graph showing the log value of scattering intensity to the scattering vector defined in small-angle X-ray scattering, may effectively inhibit an increase of reflectance at a portion that is damaged or deformed due to external rubbing or friction, and as a result, the increase of reflectance caused by friction damage may be reduced to 0.2% or less.

For example, if a peak appears in a scattering vector of less than 0.128 nm$^{-1}$ in the graph showing the log value of scattering intensity to the scattering vector defined in small-angle X-ray scattering, the distance between the hollow inorganic particles included in the anti-reflective film may become too large, and thus the refractive index of the anti-reflective film may increase or the reflectance at a portion that is damaged or deformed due to external rubbing or friction may greatly increase.

Meanwhile, if a peak first appears in a scattering vector of greater than 0.209 nm$^{-1}$ in the graph showing the log value of scattering intensity to the scattering vector defined in small-angle X-ray scattering, the distance between the hollow inorganic particles included in the anti-reflective film may become too small, and thus mechanical properties of the anti-reflective film, such as abrasion resistance, scratch resistance, etc. may be deteriorated, and the reflectance at a portion that is damaged or deformed due to external rubbing or friction may greatly increase.

The peak is an extreme value at which the log value of scattering intensity appears upwardly convex, in a graph showing the log value of scattering intensity to a scattering vector defined in small-angle X-ray scattering. Such an extreme value or inflection point may be a point at which scattering is maximized by the arrangement of the organic or inorganic particles included in the anti-reflective film.

As described above, the anti-reflective film of the embodiment may exhibit one or more peaks at the scattering vector ($q_{max}$) of 0.128 nm$^{-1}$ to 0.209 nm$^{-1}$, in the graph showing the log value of scattering intensity to the scattering vector defined in small-angle X-ray scattering. More specifically, the range of the scattering vector ($q_{max}$) of 0.128 nm$^{-1}$ to 0.209 nm$^{-1}$, in the graph showing the log value of scattering intensity to the scattering vector defined in the small-angle X-ray scattering of the anti-reflective film of the embodiment, may be a point at which a peak of the log value of scattering intensity to the scattering vector first appears.

The scattering vector defined in small-angle X-ray scattering is defined by the following Equation 1.

$$q = 4\pi \sin \theta / \lambda \quad \text{[Equation 1]}$$

In Equation 1, q is a scattering vector, θ is a ½ value of a scattering angle, and λ is a wavelength of irradiated X-rays.

Specifically, the small-angle X-ray scattering means a transmission mode or grazing incidence small-angle X-ray scattering, and for example, may be measured by irradiating X-rays of a wavelength of 0.63 Å to 1.54 Å to an anti-reflective film with a size of 1 cm*1 cm (width*length) at a distance of 4 m.

For example, small angle X-ray scattering (SAXS) may be achieved by transmitting X-rays through a sample at the 4C beam line of a Pohang Accelerator and then measuring scattering intensity according to the scattering vector (q). More specifically, the small angle scattering measurement may be conducted by placing a sample at a location about 4 m away from a detector and sending X-rays thereto, wherein X-rays having a vertical size of 0.023 mm and a horizontal size of 0.3 mm may be used, and as the detector, a 2D mar CCD may be used. Further, the scattered 2D diffraction pattern is obtained as an image, and through calibration using a sample-to-detector distance obtained through a standard sample and a circular average, scattering intensity according to the scattering vector (q) may be converted.

Meanwhile, the requirement of exhibiting one or more peaks at the scattering vector ($q_{max}$) of 0.128 nm$^{-1}$ to 0.209 nm$^{-1}$, in the graph showing the log value of scattering intensity to the scattering vector defined in small-angle X-ray scattering, is to use the hollow inorganic particles having a particle size of 35 nm to 61 nm and the hollow inorganic particles having a particle size of 64 nm to 100 nm at a weight ratio of 7:3 to 3:7, but is not limited thereto.

When the requirement is fulfilled, the hollow inorganic particles having a relatively small particle size are arranged between the hollow inorganic particles having a relatively large particle size, and thus ideal arrangement of the hollow inorganic particles occurs, which makes the average distance between the inorganic particles close. Consequently, as the anti-reflective film fulfills the requirement of exhibiting one or more peaks at the scattering vector ($q_{max}$) of 0.128 nm$^{-1}$ to 0.209 nm$^{-1}$, in the graph showing the log value of scattering intensity to the scattering vector defined in small-angle X-ray scattering, the increase of reflectance at a portion that is damaged or deformed due to external rubbing or friction may be effectively inhibited.

The two or more kinds of hollow inorganic particles having different particle sizes according to embodiments may include one kind of hollow inorganic particles having a particle size of 35 nm to 61 nm, 40 nm to 60 nm, or 45 nm to 60 nm, and one kind of hollow inorganic particles having a particle size of 64 nm to 100 nm, 65 nm to 95 nm, or 65 nm to 90 nm. The particle size of the hollow inorganic particles may be measured by transmission electron microscopy (TEM). When the particle size of the hollow inorganic particles is less than 35 nm, the refractive index of the low-refractive layer may be increased to increase reflectance, and when the particle size of the hollow inorganic particles is more than 100 nm, the strength of the low-refractive layer may be weakened to reduce scratch resistance.

A weight ratio of the one kind of the hollow inorganic particles having a particle size of 35 nm to 61 nm and one kind of the hollow inorganic particles having a particle size of 64 nm to 100 nm may be 7:3 to 3:7, 6:4 to 4:6, or 6.5:4.5 to 5:5. If the weight ratio does not meet the above range, arrangement of the hollow inorganic particles may be disturbed, and thus characteristics for the scattering vector may not be achieved, and as a result, the average reflectance of the low-refractive layer may be increased due to external rubbing or friction.

A particle size difference between the one kind of the hollow inorganic particles having a particle size of 35 nm to 61 nm and the one kind of the hollow inorganic particles having a particle size of 64 nm to 100 nm may be 3 nm to 65 nm, 5 nm to 45 nm, or 8 nm to 30 nm. If the particle size difference is too small or too large, the low-refractive layer may have increased reflectance at a portion that is damaged or deformed due to external rubbing or friction.

The one kind of the hollow inorganic particles having a particle size of 35 nm to 61 nm and the one kind of the hollow inorganic particles having a particle size of 64 nm to 100 nm may have a particle size ratio of 1:1.05 to 2.85, 1:1.1 to 2.25, or 1:1.15 to 2.0. If they do not meet the above ratio, the low-refractive layer may have increased reflectance at a portion that is damaged or deformed due to external rubbing or friction.

Meanwhile, each of the hollow inorganic particles may include one or more reactive functional groups selected from the group consisting of a (meth)acrylate group, an epoxide group, a vinyl group, and a thiol group on the surface thereof. As each of the hollow inorganic particles has the above-described reactive functional groups on the surface thereof, the low-refractive layer may have a higher degree of crosslinking, and accordingly, the increase of reflectance may be effectively inhibited at a portion that is damaged or deformed due to external rubbing or friction, and furthermore, more improved scratch resistance and anti-fouling property may be ensured.

The surface of the hollow inorganic particles may be coated with a fluorine-containing compound. When the surface of the hollow inorganic particles is coated with the fluorine-containing compound, surface energy may be further reduced, and accordingly, durability or scratch resistance of the low-refractive layer may be further improved. As a method of coating the surface of the hollow inorganic particles with the fluorine-containing compound, a commonly known particle coating or polymerizing method may be used without particular limitation, and for example, the hollow inorganic particles and the fluorine-containing compound are subjected to a sol-gel reaction in the presence of water and a catalyst, and the fluorine-containing compound may be bound to the surface of the hollow inorganic particles via hydrolysis and a condensation reaction.

Specific examples of the hollow inorganic particles may include hollow silica particles. The hollow silica may include a predetermined functional group which is substituted on the surface to be more readily dispersed in an organic solvent. Examples of the organic function group which may be substituted on the surface of the hollow silica particles are not particularly limited. For example, a (meth)acrylate group, a vinyl group, a hydroxyl group, an amine group, an allyl group, an epoxy group, a hydroxyl group, an isocyanate group, an amine group, fluorine, etc. may be substituted on the surface of the hollow silica.

Meanwhile, the organic polymer resin included in the low-refractive layer may include a cross-linked (co)polymer between a (co)polymer of a photopolymerizable compound and a fluorine-containing compound including a photoreactive functional group.

The (co)polymer of the photopolymerizable compound may form a substrate of the binder resin of the low-refractive layer. Specifically, the photopolymerizable compound may include a monomer or oligomer including (meth)acrylate or a vinyl group. More specifically, the photopolymerizable compound may include a monomer or oligomer including one or more, two or more, or three or more (meth)acrylates or vinyl groups.

Specific examples of the monomer or oligomer including (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylol propane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof; or an urethane modified acrylate oligomer, an epoxide acrylate oligomer, an etheracrylate oligomer, a dendritic acrylate oligomer, or a mixture of two or more thereof. In this regard, a weight average molecular weight of the oligomer may be 1000 to 10,000. Meanwhile, specific examples of the monomer or oligomer including the vinyl group may include divinyl benzene, styrene, or paramethylstyrene.

Specifically, the (co)polymer of the photopolymerizable compound may be a copolymer of multifunctional (meth)acrylate-based monomers including a di- to tetra-functional (meth)acrylate-based monomer and a penta- to hexa-functional (meth)acrylate-based monomer.

The di- to tetra-functional (meth)acrylate-based monomer may have a pentaerythritol structure in the center thereof, but the kind thereof may be, but is not limited to, for example, pentaerythritol di(meth)acrylate, pentaerythritol tri(meth)acrylate, or a mixture thereof. Specifically, the di- to tetra-functional (meth)acrylate-based monomer having the pentaerythritol structure in the center thereof may have the following Formula.

[Formula 1]

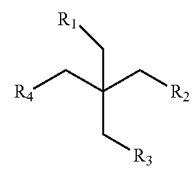

In Formula 1,
$R_1$ to $R_4$ are a hydroxyl group, a (meth)acrylate group, or a substituted or unsubstituted $C_{1-40}$ alkoxy group, provided that at least one thereof is a (meth)acrylate group.

Meanwhile, the penta- to hexa-functional (meth)acrylate-based monomer may have a dipentaerythritol structure in the center thereof, and the kind thereof may be, but is not limited to, for example, dipentaerythritol penta(meth)acrylate, dipentaerythritol hexa(meth)acrylate, or a mixture thereof. Specifically, the penta- to hexa-functional (meth)acrylate-based monomer having the dipentaerythritol structure in the center thereof may have the following Formula 2.

[Formula 2]

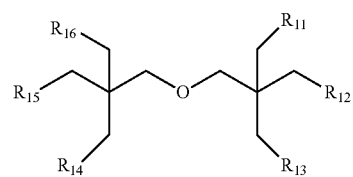

In Formula 2,
$R_{11}$ to $R_{16}$ are a hydroxyl group, a (meth)acrylate group, or a substituted or unsubstituted $C_{1-40}$ alkoxy group, provided that at least one thereof is a (meth)acrylate group.

According to Formulae 1 and 2, the di- to tetra-functional (meth)acrylate-based monomer having the pentaerythritol structure has a weight average molecular weight and a volume of twice those of the penta- to hexa-functional (meth)acrylate-based monomer having the dipentaerythritol structure, and therefore, in the copolymer, the (meth)acrylate having the relatively high weight average molecular weight and volume and the (meth)acrylate having the relatively low weight average molecular weight and volume may maximize the packing density in the unit volume, thereby increasing the degree of crosslinking as well as minimizing the free volume.

Further, the di- to tetra-functional (meth)acrylate-based monomer and the penta- to hexa-functional (meth)acrylate-based monomer may be cross-linked at a weight ratio of 9:1 to 6:4, 8.5:1.5 to 6.5:3.5, or 8:2 to 7:3, thereby maximizing the degree of crosslinking of the copolymer and minimizing the free volume of the low-refractive layer including the same. As a result, the increase of reflectance may be prevented at a portion of the low-refractive layer to which external rubbing or friction is applied.

The copolymer obtained by crosslinking polymerization of the di- to tetra-functional (meth)acrylate and the penta- to hexa-functional (meth)acrylate at a weight ratio of 9:1 to 6:4 may have the free volume of 420 Å$^3$ or less in a 125 nm$^3$ volume. If the copolymer has the free volume of more than 420 Å$^3$ in a 125 nm$^3$ volume, it is difficult to prevent the increase of reflectance at a portion that is damaged or deformed due to external rubbing or friction.

Further, the degree of crosslinking of the low-refractive layer including the copolymer may be 85% or more, 85 to 99%, 90 to 99%, or 95 to 99%. If the crosslinking density is less than 85%, the low-refractive layer may have increased reflectance at a portion that is damaged or deformed due to external rubbing or friction.

Meanwhile, the low-refractive layer may include a moiety derived from the fluorine-containing compound including the photoreactive functional group.

One or more photoreactive functional groups may be included or substituted in the fluorine-containing compound including the photoreactive functional group, wherein the photoreactive functional group means a functional group capable of participating in a polymerization reaction by light irradiation, for example, visible light irradiation or UV light irradiation. The photoreactive functional group may include various functional groups known to participate in a polymerization reaction by light irradiation, and a specific example thereof may include a (meth)acrylate group, an epoxide group, a vinyl group, or a thiol group.

As the organic polymer resin of the low-refractive layer includes the fluorine-containing compound including the photoreactive functional group, it may have lower reflectance and improved light transmittance, and furthermore, it is possible to effectively inhibit the increase of reflectance at a portion that is damaged or deformed due to external rubbing or friction.

Each of the fluorine-containing compounds including the photoreactive functional group may have a weight average molecular weight (a weight average molecular weight measured by GPC in terms of polystyrene) of 2000 to 200,000, or 5000 to 100,000. When the weight average molecular weight of the fluorine-containing compound including the photoreactive functional group is excessively small, the fluorine-containing compound in the photocurable coating composition may not be uniformly and effectively arranged on the surface, but may be positioned inside the finally manufactured low-refractive layer such that the anti-fouling property of the surface of the low-refractive layer may be deteriorated, and mechanical properties such as entire strength, scratch resistance, etc. may be deteriorated due to a decrease in the crosslinking density of the low-refractive layer. Further, when the weight average molecular weight of the fluorine-containing compound including the photoreactive functional group is excessively large, compatibility with other components in the photocurable coating composition may be deteriorated, such that haze of the finally manufactured low-refractive layer may be increased or the light transmittance thereof may be decreased, and strength of the low-refractive layer may also be deteriorated.

The fluorine-containing compound including the photoreactive functional group may include 1% by weight to 60% by weight, 2% by weight to 50% by weight, or 3% by weight to 40% by weight of fluorine. If the fluorine content is less than 1% by weight, the fluorine component may not be effectively arranged on the surface of the low-refractive layer and thus the surface slip property may be deteriorated. If the fluorine content is more than 60% by weight, the scratch resistance of the low-refractive layer may be deteriorated or the increase of reflectance may occur due to external friction.

The fluorine-containing compound including the photoreactive functional group may further include silicon or a silicon-containing compound. That is, the fluorine-containing compound including the photoreactive functional group may optionally include silicon or a silicon-containing compound inside thereof, and specifically, the content of silicon in the fluorine-containing compound including the photoreactive functional group may be 0.1% by weight to 20% by weight, 0.5% by weight to 18% by weight, or 1% by weight to 15% by weight. The silicon included in the fluorine-containing compound including the photoreactive functional group may prevent generation of haze in the low refractive layer, thereby increasing transparency. Meanwhile, if the content of silicon in the fluorine-containing compound including the photoreactive functional group becomes too high, alkali resistance of the low-refractive layer may be deteriorated.

In detail, the fluorine-containing compound including the photoreactive functional group may be: i) an aliphatic compound or alicyclic compound in which one or more photoreactive functional groups are substituted, and at least one carbon atom is substituted with one or more fluorine atoms; ii) a heteroaliphatic compound or heteroalicyclic compound in which one or more photoreactive functional groups are substituted, at least one hydrogen atom is substituted with a fluorine atom, and one or more carbon atoms are substituted with a silicon atom; iii) a polydialkylsiloxane-based polymer (e.g., a polydimethylsiloxane-based polymer) in which one or more photoreactive functional groups are substituted, and at least one silicon atom is substituted with one or more fluorine atoms; iv) a polyether compound in which one or more photoreactive functional groups are substituted, and at least one hydrogen atom is substituted with a fluorine atom; or a mixture of two or more of i) to iv) or a copolymer thereof.

The low-refractive layer may include 1 part by weight to 300 parts by weight, 10 parts by weight to 250 parts by weight, or 20 parts by weight to 200 parts by weight of the fluorine-containing compound including the photoreactive functional group, based on 100 parts by weight of the (co)polymer of the photopolymerizable compound. If the amount of the fluorine-containing compound including the photoreactive functional group is less than 20 parts by weight, based on the (co)polymer of the photopolymerizable compound, the surface slip property of the low-refractive layer may be deteriorated. If the amount is more than 300 parts by weight, the scratch resistance property may be deteriorated or reflectance may be increased at a portion that is damaged or deformed due to external rubbing or friction.

Meanwhile, a specific example of the low-refractive layer may include an organic polymer resin including a copolymer of the multifunctional (meth)acrylate-based monomers including the di- to tetra-functional (meth)acrylate-based monomer and the penta- to hexa-functional (meth)acrylate-based monomer; and two or more kinds of hollow inorganic particles having different particle sizes, which are dispersed in the organic polymer resin.

Further, the above-described low-refractive layer may be manufactured from a photocurable coating composition including the photopolymerizable compound, the fluorine-containing compound including the photoreactive functional group, the two or more kinds of the hollow inorganic nanoparticles having different particle sizes, and a photoinitiator. Specifically, the low-refractive layer may be obtained by applying the photocurable coating composition onto a predetermined substrate, and then photopolymerizing the resultant. A specific kind or thickness of the substrate is not particularly limited, but a substrate known to be used in manufacturing the hard coating layer or anti-reflective film may be used without limitation.

Meanwhile, a method and an apparatus generally used to apply the photocurable coating composition may be used without particular limitation. For example, a bar coating method such as a Mayer bar coating method or the like, a gravure coating method, a 2-roll reverse coating method, a vacuum slot die coating method, or the like, may be used.

In the step of photopolymerizing the photocurable coating composition, UV light or visible light having a wavelength of 300 nm to 800 nm may be irradiated, and at the time of irradiation, an exposure amount may be 100 mJ/cm$^2$ to 4000 mJ/cm$^2$. An exposure time is not particularly limited, but may be suitably changed depending on an exposure device to be used, a wavelength of the irradiated light, or the exposure amount. Further, in the step of photopolymerizing the photocurable coating composition, nitrogen purging or the like may be performed in order to apply a nitrogen atmosphere condition.

The low-refractive layer may include 30 parts by weight to 500 parts by weight, 50 parts by weight to 450 parts by weight, or 60 parts by weight to 400 parts by weight of the two or more kinds of the hollow inorganic particles having different particle sizes, based on 100 parts by weight of the (co)polymer of the photopolymerizable compound. If the content of the two or more kinds of the hollow inorganic particles is less than 30 parts by weight, reflectance of the low-refractive layer may be increased, and if the content is more than 500 parts by weight, the scratch resistance may be deteriorated due to reduction of the content of the organic polymer resin or reflectance may be increased at a portion that is damaged or deformed due to external rubbing or friction.

Meanwhile, as the hard coating layer, a hard coating layer commonly known may be used without particular limitation.

One example of the hard coating layer may include a hard coating layer including a binder resin including a photocurable resin; and organic or inorganic fine particles dispersed in the binder resin.

The photocurable resin included in the hard coating layer, which is a polymer of a photocurable compound capable of causing a polymerization reaction when light such as UV light or the like is irradiated, may be a photocurable resin commonly used in the art. Specifically, the photocurable resin may include: one or more selected from the group consisting of a reactive acrylate oligomer group consisting of an urethane acrylate oligomer, an epoxide acrylate oligomer, polyester acrylate, and polyether acrylate; and a multi-functional acrylate monomer group consisting of dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol diacrylate, propoxylated glycero triacrylate, tripropylene glycol diacrylate, and ethylene glycol diacrylate.

A particle size of the organic or inorganic fine particles is not specifically limited, but for example, the organic fine particles may have a particle size of 1 μm to 10 μm, and the inorganic fine particles may have a particle size of 1 nm to 500 nm, or 1 nm to 300 nm. The particle size of the organic or inorganic fine particles may be defined as a volume average particle size.

Specific examples of the organic or inorganic fine particles included in the hard coating layer are not limited, but the organic or inorganic fine particles may include, for example, organic fine particles made of an acrylic resin, a styrene-based resin, an epoxide resin, and a nylon resin, or inorganic fine particles made of silicon oxide, titanium dioxide, indium oxide, tin oxide, zirconium oxide, and zinc oxide.

The binder resin of the hard coating layer may further include a high-molecular weight (co)polymer having a weight average molecular weight of 10,000 or more.

The high-molecular weight (co)polymer may be one or more selected from the group consisting of cellulose-based polymers, acrylic polymers, styrene-based polymers, epoxide-based polymers, nylon-based polymers, urethane-based polymers, and polyolefin-based polymers.

Meanwhile, another example of the hard coating layer may include a hard coating film including the organic polymer resin of the photocurable resin; and an antistatic agent dispersed in the organic polymer resin.

The antistatic agent may be a quaternary ammonium salt compound; a pyridinium salt; a cationic compound having 1 to 3 amino groups; an anionic compound such as a sulfonic acid base, a sulfuric acid ester base, a phosphoric acid ester base, a phosphonic acid base, or the like; an amphoteric compound such as an amino acid-based or amino sulfuric acid ester-based compound, or the like; a non-ionic compound such as an imino alcohol-based compound, a glycerine-based compound, a polyethylene glycol-based compound, or the like; an organic metal compound such as metal alkoxide compound containing tin, titanium, etc., or the like; a metal chelate compound such as an acetylacetonate salt of the organic metal compound, or the like; a reaction product or polymer compound of two or more thereof; or a mixture of two or more thereof. Here, the quaternary ammonium salt compound may be a compound having one or more quaternary ammonium salt groups in a molecule, and a low-molecular weight quaternary ammonium salt compound or a high-molecular weight quaternary ammonium salt compound may be used without limitation.

Further, as the antistatic agent, a conductive polymer and metal oxide fine particles may also be used. Examples of the conductive polymer may include aromatic conjugated poly (paraphenylene), heterocyclic conjugated polypyrrole, polythiophene, aliphatic conjugated polyacetylene, heteroatom-containing conjugated polyaniline, and a mixed type of conjugated poly(phenylenevinylene), a double chain conjugated compound, which is a conjugated compound having a plurality of conjugated chains in a molecule, a conductive complex in which a conjugated polymer chain is grafted to or block-copolymerized with a saturated polymer, and the like. Further, the metal oxide fine particles may include zinc oxide, antimony oxide, tin oxide, cerium oxide, indium tin oxide, indium oxide, aluminum oxide, tin oxide doped with antimony, zinc oxide doped with aluminum, or the like.

The hard coating layer including the organic polymer resin of the photopolymerizable resin; and the antistatic agent dispersed in the organic polymer resin, may further include one or more compounds selected from the group consisting of an alkoxy silane-based oligomer and a metal alkoxide-based oligomer.

The alkoxy silane-based compound may be an alkoxy silane-based compound commonly used in the art, but it may be one or more compounds selected from the group consisting of tetramethoxysilane, tetraethoxysilane, tetraisopropoxysilane, methyltrimethoxysilane, methyltriethoxysilane, methacryloxypropyltrimethoxysilane, glycidoxypropyl trimethoxysilane, and glycidoxypropyl triethoxysilane.

Further, the metal alkoxide-based oligomer may be prepared by a sol-gel reaction of a composition containing a metal alkoxide-based compound and water. The sol-gel reaction may be carried out by a method equivalent to a method of preparing the alkoxy silane-based oligomer described above. However, since the metal alkoxide-based compound may violently react with water, the sol-gel reaction may be carried out by diluting the metal alkoxide-based compound in an organic solvent and then slowly dripping water thereto. In this regard, a molar ratio (based on metal ions) of the metal alkoxide compound to water may be adjusted in the range of 3 to 170 in consideration of reaction efficiency, or the like.

Here, the metal alkoxide-based compound may be one or more compounds selected from the group consisting of titanium tetra-isopropoxide, zirconium isopropoxide, and aluminum isopropoxide.

Meanwhile, the anti-reflective film may further include a substrate bound to the other side of the hard coating layer. The substrate may be a transparent film having light transmittance of 90% or more and haze of 1% or less. Further, the material of the substrate may be a triacetyl cellulose, a cycloolefin polymer, a polyacrylate, a polycarbonate, a polyethylene terephthalate, or the like. In addition, a thickness of the substrate film may be 10 to 300 μm in consideration of productivity, etc., but is not limited thereto.

Further, the anti-reflective film may include an additional functional layer between the low-refractive layer and the hard coating layer.

Specifically, the anti-reflective film may further include, as the functional layer, a light transmissive substrate having thickness-direction retardation (Rth) of 3000 nm or more, 5000 nm or more, or 5000 nm to 20,000 nm, as measured at a wavelength of 400 nm to 800 nm.

Specific examples of such a light transmissive substrate may include a uniaxially stretched polyethylene terephthalate film or biaxially stretched polyethylene terephthalate film.

When the anti-reflective film includes the light transmissive substrate having a thickness-direction retardation of 3000 nm or more, 5000 nm or more, or 5000 nm to 20,000 nm, as measured at a wavelength of 400 nm to 800 nm, a rainbow phenomenon caused by interference of visible light may be alleviated, as compared with use of those having the retardation of less than 3000 nm.

The thickness-direction retardation may be determined by a measuring method and a measuring instrument that are generally known. For example, the measuring instrument of the thickness-direction retardation may include "AxoScan", which is a product name produced by Axometrics, Inc.

For example, with regard to measurement conditions of the thickness-direction retardation, a value of a refractive index (589 nm) of the light transmissive substrate film was input into the measuring instrument, and the thickness-direction retardation of the light transmissive substrate film was measured under conditions of a temperature of 25° C. and humidity of 40% with light at a wavelength of 590 nm, and the measured value (measured value by automatic measurement (automatic calculation) of the measuring instrument) of the thickness-direction retardation was converted into a retardation value per 10 μm of film thickness, thereby calculating the thickness-direction retardation. Further, the size of the light transmissive substrate of the measurement sample is not particularly limited as long as it is larger than the photometric part (diameter: about 1 cm) of the stage of the measuring instrument. However, the size may have a length of 76 mm, a width of 52 mm, and a thickness of 13 μm.

In addition, the value of "refractive index (589 nm) of the light transmissive substrate" used in measuring the thickness-direction retardation may be calculated by forming an unstretched film including the same type of a resin film as the light transmissive substrate forming the film to be measured for retardation, and then using the unstretched film as a measurement sample (in the case where the film to be measured is an unstretched film, the film may be used as it is as a measurement sample), and measuring an in-plane direction (direction perpendicular to the thickness direction) refractive index of the measurement sample at 589 nm using a refractometer (product name: "NAR-1T SOLID" manufactured by Atago Co., Ltd.) as a measuring device under conditions of a light source of 589 nm and a temperature condition of 23° C.

According to another embodiment of the present invention, a polarizing plate including the anti-reflective film is provided. The polarizing plate may include a polarizing film and the anti-reflective film formed on at least one side of the polarizing film.

A material and a preparation method of the polarizing film are not particularly limited, and a common material and preparation method known in the art may be used. For example, the polarizing film may be a polyvinyl alcohol-based polarizing film.

A protective film may be provided between the polarizing film and the anti-reflective film. Examples of the protective film are not limited, but may be, for example, any one or more of a COP (cycloolefin polymer)-based film, an acrylic film, a TAC (triacetylcellulose)-based film, a COC (cycloolefin copolymer)-based film, a PNB (polynorbornene)-based film, and a PET (polyethylene terephthalate)-based film.

As the protective film, a substrate for forming a single coating layer upon manufacturing the anti-reflective film may be used as it is. The polarizing film and the anti-reflective film may be laminated by an adhesive such as an aqueous adhesive, a non-aqueous adhesive, etc.

According to still another embodiment of the present invention, a display device including the above-described anti-reflective film is provided. Specific examples of the display device are not limited, but may include, for example, liquid crystal display devices, plasma display devices, and organic light emitting diode devices.

For example, the display device may be a display device including a pair of polarizing plates facing each other; a thin film transistor, a color filter, and a liquid crystal cell which are sequentially stacked between a pair of the polarizing plates; and a backlight unit.

In the display device, the anti-reflective film may be provided on the outermost surface of a display panel facing an observer or on the outermost surface thereof facing a backlight.

In the display device including the anti-reflective film, the anti-reflective film may be placed on one side of the polarizing plate which is relatively distant from the backlight unit, among a pair of the polarizing plates.

Further, the display device may include a display panel, a polarizing film that is provided on at least one side of the panel, and the anti-reflective film that is provided on the side opposite to the side of the polarizing film facing the panel.

Advantageous Effects

According to the present invention, an anti-reflective film inhibiting an increase of reflectance at a portion that is damaged or deformed due to external rubbing or friction, while having mechanical properties such as high abrasion resistance, scratch resistance, etc., and excellent optical properties; a polarizing plate including the anti-reflective film; and a display device including the anti-reflective film are provided.

DETAILED DESCRIPTION OF THE EMBODIMENTS

The present invention will be described in more detail with reference to the following examples. However, the following examples are only to exemplify the present invention, and contents of the present invention are not limited by the following examples.

Preparation Examples 1 to 3: Preparation of Hard Coating Layer

Preparation Example 1

30 g of pentaerythritol triacrylate, 2.5 g of a high molecular weight copolymer (BEAMSET 371, Arakawa Co. Ltd., epoxy acrylate, weight average molecular weight: 40,000), 20 g of methylethylketone, and 0.5 g of a leveling agent (Tego wet 270) were uniformly mixed, and then 2 g of acryl-styrene copolymer fine particles (volume average particle size: 2 μm, Manufacturing Company: Sekisui Plastic) with a refractive index of 1.525 was added to prepare a hard coating composition.

The hard coating composition thus obtained was coated on a triacetyl cellulose film using a #10 Mayer bar and dried at 90° C. for 1 minute. The dried coating was irradiated with UV light of 150 mJ/cm² to prepare a hard coating layer with a thickness of 4 μm.

Preparation Example 2

The hard coating composition of Preparation Example 1 was coated on a PET film having a thickness of 80 μm and retardation of 10,000 nm using a #10 Mayer bar and dried at 60° C. for 1 minute. The dried coating was irradiated with UV light of 150 mJ/cm² to prepare a hard coating layer with a thickness of 4 μm.

Preparation Example 3

A salt-type antistatic hard coating solution of KYOEISHA Chemical Co., Ltd. (solid content: 50% by weight, product name: LJD-1000) was coated on a triacetyl cellulose film using a #10 Mayer bar, dried at 90° C. for 1 minute, and irradiated with UV light of 150 mJ/cm², thereby preparing a hard coating layer having a thickness of about 5 μm.

Examples 1 to 6: Preparation of Anti-Reflective Film

Example 1

Based on 100 parts by weight of trimethylolpropane triacrylate (TMPTA), 40 parts by weight of first hollow silica nanoparticles (particle size: 53.1 nm, as measured by a dynamic light scattering method), 78 parts by weight of second hollow silica nanoparticles (particle size: 73.5 nm, as measured by a dynamic light scattering method), 15 parts by weight of a fluorine-containing compound (RS-90, DIC), and 25 parts by weight of an initiator (Irgacure 127, Ciba) were diluted in a MIBK (methyl isobutyl ketone) solvent such that a solid content was 3.0% by weight, thereby preparing a photocurable coating composition.

The photocurable coating composition was coated on the hard coating film of Preparation Example 1 using a #4 Mayer bar so as to have a thickness of about 110 nm to 120 nm, and dried and cured at a temperature of 60° C. for 1 minute, thereby manufacturing an anti-reflective film. At the time of curing, the dried coating resultant was irradiated with UV light of 252 mJ/cm² under nitrogen purging.

Example 2

Based on 100 parts by weight of a mixed binder of pentaerythritol triacrylate (PETA) and dipentaerythritol hexaacrylate (DPHA) (mixing ratio of PETA:DPHA=7:3), 60 parts by weight of first hollow silica nanoparticles (particle size: 50.2 nm, as measured by a dynamic light scattering method), 80 parts by weight of second hollow silica nanoparticles (particle size: 71.7 nm, as measured by a dynamic light scattering method), 32 parts by weight of a fluorine-containing compound (RS-907, DIC), and 29.3 parts by weight of an initiator (Irgacure 127, Ciba) were diluted in a MIBK (methyl isobutyl ketone) solvent such that a solid content was 3.3% by weight, thereby preparing a photocurable coating composition.

The photocurable coating composition was coated on the hard coating film of Preparation Example 1 using a #4 Mayer bar so as to have a thickness of about 110 nm to 120 nm, and dried and cured at a temperature of 60° C. for 1 minute, thereby manufacturing an anti-reflective film. At the time of curing, the dried coating resultant was irradiated with UV light of 252 mJ/cm² under nitrogen purging.

Example 3

Based on 100 parts by weight of a mixed binder of pentaerythritol triacrylate (PETA) and dipentaerythritol hexaacrylate (DPHA) (a mixing ratio of PETA:DPHA=6:4), 110 parts by weight of first hollow silica nanoparticles (particle size: 43.3 nm, as measured by a dynamic light scattering method), 62 parts by weight of second hollow silica nanoparticles (particle size: 68.7 nm, as measured by a dynamic light scattering method), 147 parts by weight of solid silica nanoparticles (particle size: about 18 nm), 17 parts by weight of a fluorine-containing compound (RS-907, DIC), and 14.6 parts by weight of an initiator (Irgacure 127, Ciba) were diluted in a MIBK (methyl isobutyl ketone) solvent such that a solid content was 2.8% by weight, thereby preparing a photocurable coating composition.

The photocurable coating composition was coated on the hard coating film of Preparation Example 1 using a #4 Mayer bar so as to have a thickness of about 110 nm to 120 nm, and dried and cured at a temperature of 60° C. for 1 minute, thereby manufacturing an anti-reflective film. At the time of curing, the dried coating resultant was irradiated with UV light of 252 mJ/cm$^2$ under nitrogen purging.

Example 4

Based on 100 parts by weight of TMPTA, 81.2 parts by weight of first hollow silica nanoparticles (particle size: 47.7 nm, as measured by a dynamic light scattering method), 60.8 parts by weight of second hollow silica nanoparticles (particle size: 78.9 nm, as measured by a dynamic light scattering method), 115 parts by weight of solid silica nanoparticles (particle size: about 13 nm), 10.1 parts by weight of a fluorine-based compound (RS-907, DIC), and 8.4 parts by weight of an initiator (Irgacure 127, Ciba) were diluted in a MIBK (methyl isobutyl ketone) solvent such that a solid content was 3.2% by weight, thereby preparing a photocurable coating composition.

The photocurable coating composition was coated on the hard coating film of Preparation Example 2 using a #4 Mayer bar so as to have a thickness of about 110 nm to 120 nm, and dried and cured at a temperature of 60° C. for 1 minute. At the time of curing, the dried coating resultant was irradiated with UV light of 252 mJ/cm$^2$ under nitrogen purging.

Example 5

Based on 100 parts by weight of PETA, 134.2 parts by weight of first hollow silica nanoparticles (particle size: 45.5 nm, as measured by a dynamic light scattering method), 234.8 parts by weight of second hollow silica nanoparticles (particle size: 82.1 nm, as measured by a dynamic light scattering method), 67 parts by weight of solid silica nanoparticles (particle size: about 12 nm), 115 parts by weight of a fluorine-based compound (RS-923, DIC), and 31 parts by weight of an initiator (Irgacure 907, Ciba) were diluted in a MIBK (methyl isobutyl ketone) solvent such that a solid content was 2.9% by weight, thereby preparing a photocurable coating composition.

The photocurable coating composition was coated on the hard coating film of Preparation Example 3 using a #4 Mayer bar so as to have a thickness of about 110 nm to 120 nm, and dried and cured at a temperature of 60° C. for 1 minute, thereby manufacturing an anti-reflective film. At the time of curing, the dried coating resultant was irradiated with UV light of 252 mJ/cm$^2$ under nitrogen purging.

Example 6

Based on 100 parts by weight of a mixed binder of pentaerythritol triacrylate (PETA) and dipentaerythritol hexaacrylate (DPHA) (a mixing ratio of PETA:DPHA=5:5), 111 parts by weight of first hollow silica nanoparticles (particle size: 53.1 nm, as measured by a dynamic light scattering method), 91 parts by weight of second hollow silica nanoparticles (particle size: 77.2 nm, as measured by a dynamic light scattering method), 55 parts by weight of solid silica nanoparticles (particle size: about 18 nm), 85 parts by weight of a fluorine-based compound (RS-907, DIC), and 17.1 parts by weight of an initiator (Irgacure 127, Ciba) were diluted in a MIBK (methyl isobutyl ketone) solvent such that a solid content was 3.0% by weight, thereby preparing a photocurable coating composition.

The photocurable coating composition was coated on the hard coating film of Preparation Example 3 using a #4 Mayer bar so as to have a thickness of about 110 nm to 120 nm, and dried and cured at a temperature of 60° C. for 1 minute, thereby manufacturing an anti-reflective film. At the time of curing, the dried coating resultant was irradiated with UV light of 252 mJ/cm$^2$ under nitrogen purging.

Comparative Examples 1 to 6: Preparation of Anti-Reflective Film

Comparative Example 1

An anti-reflective film was manufactured in the same manner as in Example 1, except that only 118 parts by weight of hollow silica nanoparticles (particle size: 44.1 nm, as measured by a dynamic light scattering method) was used without using a mixture of first hollow silica nanoparticles (particle size: 53.1 nm, as measured by a dynamic light scattering method) and second hollow silica nanoparticles (particle size: 73.5 nm, as measured by a dynamic light scattering method).

Comparative Example 2

An anti-reflective film was manufactured in the same manner as in Example 2, except that only 140 parts by weight of hollow silica nanoparticles (particle size: 47.4 nm, as measured by a dynamic light scattering method) was used without using a mixture of first hollow silica nanoparticles (particle size: 50.2 nm, as measured by a dynamic light scattering method) and second hollow silica nanoparticles (particle size: 71.7 nm, as measured by a dynamic light scattering method).

Comparative Example 3

An anti-reflective film was manufactured in the same manner as in Example 3, except that only 172 parts by weight of hollow silica nanoparticles (particle size: 49.1 nm, as measured by a dynamic light scattering method) was used without using a mixture of first hollow silica nanoparticles (particle size: 43.3 nm, as measured by a dynamic light scattering method) and second hollow silica nanoparticles (particle size: 68.7 nm, as measured by a dynamic light scattering method).

Comparative Example 4

An anti-reflective film was manufactured in the same manner as in Example 4, except that only 172 parts by weight of hollow silica nanoparticles (particle size: 100.1 nm, as measured by a dynamic light scattering method) was used without using a mixture of first hollow silica nanoparticles (particle size: 47.7 nm, as measured by a dynamic light scattering method) and second hollow silica nanoparticles (particle size: 78.9 nm, as measured by a dynamic light scattering method).

Comparative Example 5

An anti-reflective film was manufactured in the same manner as in Example 5, except that 295.2 parts by weight of first hollow silica nanoparticles (particle size: 44.1 nm, as measured by a dynamic light scattering method) and 73.8 parts by weight of second hollow silica nanoparticles (particle size: 93.5 nm, as measured by a dynamic light scattering method) were used instead of 134.2 parts by weight of first hollow silica nanoparticles (particle size: 45.5 nm, as measured by a dynamic light scattering method) and second hollow silica nanoparticles (particle size: 82.1 nm, as measured by a dynamic light scattering method).

Comparative Example 6

An anti-reflective film was manufactured in the same manner as in Example 6, except that 40.4 parts by weight of first hollow silica nanoparticles (particle size: 40.8 nm, as measured by a dynamic light scattering method) and 161.6 parts by weight of second hollow silica nanoparticles (particle size: 79.7 nm, as measured by a dynamic light scattering method) were used instead of 111 parts by weight of first hollow silica nanoparticles (particle size: 53.1 nm, as measured by a dynamic light scattering method) and 91 parts by weight of second hollow silica nanoparticles (particle size: 77.2 nm, as measured by a dynamic light scattering method).

Evaluation

1. Measurement of Particle Size Range of Hollow Inorganic Particles

The particle size ranges of the hollow inorganic particles included in the low-refractive layers of the anti-reflective films obtained in the examples and comparative examples were measured using a transmission electron microscope (TEM). In detail, any part of each anti-reflective film was selected, and photographed with a transmission electron microscope at 25,000× magnification. The particle sizes of the hollow particles identified in the photograph were measured and divided into two groups, and the results are described in the following Table 1.

TABLE 1

|  | Particle size range of hollow inorganic particles (Group 1) | Particle size range of hollow inorganic particles (Group 2) |
| --- | --- | --- |
| Example 1 | 46.3 nm~60.8 nm | 66 nm~81.3 nm |
| Example 2 | 41.1 nm~60.2 nm | 64.5 nm~78.1 nm |
| Example 3 | 37.3 nm~50.1 nm | 64.5 nm~73.5 nm |
| Example 4 | 39.1 nm~57.3 nm | 70.3 nm~95.2 nm |
| Example 5 | 35.3 nm~55.8 nm | 66.3 nm~98 nm |
| Example 6 | 47.3 nm~60.5 nm | 67.5 nm~83.1 nm |
| Comparative Example 1 | 36.2 nm~51.9 nm | — |
| Comparative Example 2 | 30.6 nm~62.1 nm | — |
| Comparative Example 3 | 31.8 nm~65.3 nm | — |
| Comparative Example 4 | — | 83.1 nm~120.3 nm |
| Comparative Example 5 | 36.5 nm~51.8 nm | 78.7 nm~108.4 nm |
| Comparative Example 6 | 32.8 nm~48.1 nm | 70.1 nm~89.5 nm |

Referring to the particle size ranges of the hollow inorganic particles of the examples in Table 1, it was confirmed that Group 1 and Group 2 meet the particle size of 35 nm to 61 nm and 64 nm to 100 nm, respectively, while the comparative examples include hollow inorganic particles having one particle size range, or do not meet the particle size range.

2. Measurement of Scattering Intensity According to Scattering Vector in Small-Angle X-Ray Scattering To a specimen of 1 cm*1 cm (width*length) obtained from each of the anti-reflective films of the examples and comparative examples, X-rays of a wavelength of 1.54 Å were irradiated at a distance of 4 m to measure the scattering vector and scattering intensity.

In detail, scattering intensity according to the scattering vector (q) was measured by transmitting X-rays through the specimen at a 4C beam line of a Pohang accelerator. In more detail, small angle scattering measurement was conducted by placing the specimen at a location about 4 m away from a detector and sending X-rays thereto, using X-rays with a vertical size of 0.023 mm and a horizontal size of 0.3 mm, and using a 2D mar CCD as a detector. The scattered 2D diffraction pattern was obtained as an image, which was converted into scattering intensity according to the scattering vector (q) through calibration using a sample-to-detector distance obtained through a standard sample, and a circular average.

$$q = 4\pi \sin \theta / \lambda \quad \text{[Equation 1]}$$

In Equation 1, q is a scattering vector, θ is a ½ value of a scattering angle, and λ is a wavelength of irradiated X-rays.

Based on the above measurement results, a scattering vector ($q_{max}$) value at which a first peak appears in a graph showing the log value of scattering intensity according to the scattering vector defined in small angle X-ray scattering was calculated, and the results are shown in the following Table 2.

3. Measurement of Reflectance Before and after Rubbing Test

The surface of the hard coating layer of each of the anti-reflective films obtained in the examples and comparative examples, on which the low-refractive layer was not formed, was subjected to a darkening process to prevent light transmission. Before and after a rubbing test, the average reflectance of the low-refractive layer of each anti-reflective film was measured. At this time, the rubbing test to rub the surface of the low-refractive layer was performed by a method of applying a load of 500 g to a steel wool with #0000 grade, and reciprocating ten times at a speed of 33 rpm.

In detail, before the rubbing test, a darkening treatment of the surface, on which no hard coating layer and no low-refractive layer were formed, was performed to prevent light transmission, and average reflectance was measured in a wavelength range of 380 nm to 780 nm using a reflectance mode of Solidspec 3700 (UV-Vis spectrophotometer, SHIMADZU). The results are shown in "$R_0$" of the following Table 1. After the rubbing test, average reflectance was measured for the low-refractive layer in the same manner as the method of measuring $R_0$, and the results are shown in "$R_1$" of the following Table 2. Further, a difference between $R_0$ and $R_1$ was calculated, and variation in the reflectance before and after the rubbing test is shown in "ΔR" of the following Table 2.

4. Measurement of Color Coordinate Value (b*)

The surface of the hard coating layer of each of the anti-reflective films obtained in the examples and comparative examples, on which the low-refractive layer was not formed, was subjected to a darkening process to prevent light transmission. Before and after a rubbing test, reflectance was measured using a reflectance mode of Solidspec 3700 (UV-Vis spectrophotometer, SHIMADZU), and a color coordinate value (b*) of the low-refractive layer was measured using a UV-2401PC Color Analysis program. At this time, the rubbing test to rub the surface of the low-refractive layer was performed by a method of applying a load of 500 g to a steel wool with #0000 grade, and reciprocating ten times at a speed of 33 rpm.

In detail, before the rubbing test, the color coordinate value of the low-refractive layer was measured and the results are in "$b^*_0$" of the following Table 2. After the rubbing test, the color coordinate value was measured for the low-refractive layer in the same manner as the method of measuring $b^*_0$, and the results are shown in "$b^*_1$" of the following Table 2. Further, a difference between $b^*_0$ and $b^*_1$ was calculated, and variation in the color coordinate values before and after the rubbing test is shown in "$\Delta b^*$" of the following Table 2.

5. Measurement of Scratch Resistance

While a steel wool with #0000 grade was loaded and allowed to reciprocate 10 times at 27 rpm, the low-refractive layer of each of the anti-reflective films obtained in Examples and Comparative Examples was rubbed. The maximum load under which one or less scratch of 1 cm or less was observed with the unaided eye, was measured. The results are shown in the following Table 2.

6. Measurement of Anti-Fouling Property

The anti-fouling property was measured by drawing a straight line having a length of 5 cm on the low-refractive layer of each of the anti-reflective films obtained in the examples and comparative examples using a black felt pen and confirming the number of scrubbing actions required for erasing the straight line at the time of scrubbing the anti-reflective film with a wiper. The results are shown in the following Table 2.

<Measurement Standard>

O: The number of rubbing actions required for erasing the straight line was 10 or less.

Δ: The number of rubbing actions required for erasing the straight line was 11 to 20.

X: The number of rubbing actions required for erasing the straight line was more than 20.

As shown in Table 2, the results of measuring the 'scattering intensity according to scattering vector in small-angle X-ray scattering' for the anti-reflective films of Examples 1 to 6 showed that a first peak appeared at a scattering vector ($q_{max}$) of 0.128 nm$^{-1}$ to 0.209 nm$^{-1}$. In contrast, the results of measuring the 'scattering intensity according to scattering vector in small-angle X-ray scattering' for the anti-reflective films of Comparative Examples 1 to 6 showed that a first peak appeared at a scattering vector outside the range of 0.128 nm$^{-1}$ to 0.209 nm$^{-1}$.

Further, the anti-reflective films of Examples 1 to 6 which meet the value range of the scattering vector showed remarkably low variation in the reflectance ($\Delta R$) and the color coordinate value ($\Delta b^*$) before and after the rubbing test, as compared with those of Comparative Examples 1 to 6 which do not meet the above value range. Accordingly, it may be expected that the anti-reflective films of Examples 1 to 6 may effectively inhibit the increase of reflectance at a portion that is damaged or deformed due to external rubbing or friction.

What is claimed is:

1. An anti-reflective film comprising:
   a hard coating layer; and
   a low-refractive layer including an organic polymer resin and two or more kinds of hollow inorganic particles dispersed in the organic polymer resin and having different particle sizes,
   wherein the two or more kinds of hollow inorganic particles having different particle sizes include a first hollow inorganic particles having a particle size of 35 nm to 61 nm and a second hollow inorganic particles having a particle size of 64 nm to 100 nm,
   wherein the organic polymer resin included in the low-refractive layer includes a cross-linked (co)polymer between a (co)polymer of a photopolymerizable compound and a fluorine-containing compound including a photoreactive functional group,
   wherein the (co)polymer of the photopolymerizable compound includes a copolymer of multifunctional (meth)acrylate-based monomers including a di- to tetra-functional (meth)acrylate-based monomer and a penta- to hexa-functional (meth)acrylate-based monomer,
   wherein a weight ratio of the di- to tetra-functional (meth)acrylate-based monomer and the penta- to hexa-functional (meth)acrylate-based monomer is 9:1 to 6:4, and

TABLE 2

|  | $q_{max}$ (nm$^{-1}$) | $R_0$ (%) | $R_1$ (%) | $\Delta R$ (% p) | $b_0^*$ | $b_1^*$ | $\Delta b^*$ | Scratch resistance (g) | Anti-fouling property |
|---|---|---|---|---|---|---|---|---|---|
| Example 1 | 0.201 | 1.58 | 1.6 | 0.02 | −3.28 | −3.21 | 0.07 | 500 | O |
| Example 2 | 0.199 | 1.48 | 1.50 | 0.02 | −3.87 | −3.85 | 0.02 | 500 | O |
| Example 3 | 0.174 | 1.37 | 1.40 | 0.03 | −4.01 | −3.81 | 0.2 | 500 | O |
| Example 4 | 0.155 | 1.13 | 1.20 | 0.07 | −3.92 | −3.62 | 0.3 | 500 | O |
| Example 5 | 0.148 | 0.67 | 0.71 | 0.04 | −2.98 | −2.7 | 0.28 | 500 | O |
| Example 6 | 0.131 | 0.25 | 0.29 | 0.04 | −4.87 | −4.46 | 0.41 | 300 | O |
| Comparative Example 1 | 0.214 | 1.55 | 1.81 | 0.26 | −3.33 | −2.82 | 0.51 | 500 | O |
| Comparative Example 2 | 0.225 | 1.52 | 1.8 | 0.28 | −2.11 | −1.49 | 0.62 | 500 | O |
| Comparative Example 3 | 0.231 | 1.4 | 1.72 | 0.32 | −1.98 | −1.28 | 0.7 | 500 | O |
| Comparative Example 4 | 0.071 | 1.21 | 1.51 | 0.30 | −3.76 | −3.08 | 0.68 | 500 | O |
| Comparative Example 5 | 0.092 | 0.79 | 1.01 | 0.22 | −4.71 | −3.73 | 0.98 | 300 | O |
| Comparative Example 6 | 0.125 | 0.3 | 0.59 | 0.29 | −4.42 | −3.32 | 1.1 | 200 | X | wherein the anti-reflective film exhibits one or more peaks at a scattering vector ($q_{max}$) of 0.128 nm$^{-1}$ to 0.209 nm$^{-1}$ in a graph showing a log value of a scattering intensity to a scattering vector defined in small-angle X-ray scattering.

2. The anti-reflective film of claim 1, wherein the small-angle X-ray scattering is measured by irradiating X-rays of a wavelength of 0.63 Å to 1.54 Å to an anti-reflective film with a size of 1 cm*1 cm (width*length) at a distance of 4 m.

3. The anti-reflective film of claim 1, wherein the scattering vector is defined by Equation 1:

$$q = 4\pi \sin\theta/\lambda \qquad \text{[Equation 1]}$$

wherein, in Equation 1, q is a scattering vector, θ is a ½ value of a scattering angle, and λ is a wavelength of irradiated X-rays.

4. The anti-reflective film of claim 1, wherein the first hollow inorganic particles and the second hollow inorganic particles have a particle size ratio of 1:1.05 to 2.85.

5. The anti-reflective film of claim 1, wherein a weight ratio of the first hollow inorganic particles and the second hollow inorganic particles is 7:3 to 3:7.

6. The anti-reflective film of claim 1, wherein the low-refractive layer includes 30 parts by weight to 500 parts by weight of the two or more kinds of the hollow inorganic particles having different particle sizes, based on 100 parts by weight of the (co)polymer of the photopolymerizable compound.

7. The anti-reflective film of claim 1, wherein the organic polymer resin includes 1 to 300 parts by weight of the fluorine-containing compound including the photoreactive functional group, based on 100 parts by weight of the (co)polymer of the photopolymerizable compound.

8. The anti-reflective film of claim 1, further comprising a light transmissive substrate having a thickness-direction retardation (Rth) of 3000 nm or more, as measured at a wavelength of 400 nm to 800 nm.

9. A polarizing plate comprising the anti-reflective film of claim 1 and a polarizing film.

10. A display device comprising the anti-reflective film of claim 1.

11. The anti-reflective film of claim 1, wherein the hard coating layer includes a binder resin including a photocurable resin and organic or inorganic fine particles dispersed in the binder resin.

12. The anti-reflective film of claim 1, wherein the hard coating layer includes an organic polymer resin of a photocurable resin and an antistatic agent dispersed in the organic polymer resin.

* * * * *